(12) United States Patent
Beyel, III et al.

(10) Patent No.: US 10,346,295 B2
(45) Date of Patent: Jul. 9, 2019

(54) TRAFFIC REPLAY TO DETECT INTERFACE CHANGES

(71) Applicant: Microsoft Technology Licensing, LLC, Redmond, WA (US)

(72) Inventors: Harold E. Beyel, III, Bellevue, WA (US); Piotr Aleksander Ciszewski, Bothell, WA (US); Daulet Zhanguzin, Bellevue, WA (US); Syed Wali Hamza, Redmond, WA (US); Dongyang Cheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 15/487,727

(22) Filed: Apr. 14, 2017

(65) Prior Publication Data

US 2018/0300228 A1    Oct. 18, 2018

(51) Int. Cl.
G06F 11/36    (2006.01)

(52) U.S. Cl.
CPC ...... *G06F 11/3692* (2013.01); *G06F 11/3688* (2013.01)

(58) Field of Classification Search
CPC ............. G06F 9/44589; G06F 11/3466; G06F 11/3688
USPC ........................................ 717/126, 127, 124
See application file for complete search history.

(56) References Cited

U.S. PATENT DOCUMENTS

| 6,408,403 | B1 | 6/2002 | Rodrigues et al. |
| 7,506,318 | B1 * | 3/2009 | Lindo ................. G06F 11/3644 717/130 |
| 8,386,852 | B2 | 2/2013 | Cohen et al. |
| 8,547,974 | B1 | 10/2013 | Guruswamy et al. |

(Continued)

FOREIGN PATENT DOCUMENTS

| KR | 20100011347 A | 2/2010 |
| WO | 2005082072 A2 | 9/2005 |

OTHER PUBLICATIONS

"Recording Traffic", https://www.soapui.org/http-recording/recording.html, Published on: Apr. 8, 2014, 4 pages.

(Continued)

*Primary Examiner* — Phillip H Nguyen

(57) ABSTRACT

Systems, methods, apparatuses, and software for software testing systems in computing environments are provided herein. In one example, software modules are instantiated within an enveloping framework for replaying or recording of user activity with regards to the software modules. Based at least on the enveloping framework placed in a replay mode of operation, the enveloping framework provides replayed inputs to the software modules based on previously recorded user activity, the replayed inputs each associated with unique identifiers mapping into the previously recorded user activity. The enveloping framework monitors outputs from the software modules and correlates the outputs to the inputs using the unique identifiers. Changes are detected in operation of the software modules based in part on a comparison of previously recorded outputs from the software modules to the outputs that are determined by the software modules when using the replayed inputs.

20 Claims, 5 Drawing Sheets

(56) References Cited

U.S. PATENT DOCUMENTS

| | | | | |
|---|---|---|---|---|
| 8,732,670 | B1 * | 5/2014 | Daudel | G06F 9/44521 |
| | | | | 717/127 |
| 8,769,518 | B1 * | 7/2014 | Daudel | G06F 9/455 |
| | | | | 717/166 |
| 8,966,453 | B1 * | 2/2015 | Zamfir | G06F 11/3604 |
| | | | | 714/38.1 |
| 8,990,778 | B1 | 3/2015 | Allocca et al. | |
| 9,616,338 | B1 * | 4/2017 | Hooper | G06F 3/016 |
| 2003/0055883 | A1 * | 3/2003 | Wiles, Jr. | G06F 11/3414 |
| | | | | 709/203 |
| 2003/0135478 | A1 * | 7/2003 | Marshall | G06F 16/2282 |
| 2004/0111727 | A1 | 6/2004 | Schwarzbauer et al. | |
| 2006/0126817 | A1 * | 6/2006 | Beckett, II | H04M 3/5175 |
| | | | | 379/265.06 |
| 2007/0150568 | A1 | 6/2007 | Ruiz | |
| 2014/0373030 | A1 * | 12/2014 | Francis | G06F 9/542 |
| | | | | 719/318 |

OTHER PUBLICATIONS

Jung, et al., "Privacy Oracle: a System for Finding Application Leaks with Black Box Differential Testing", In Proceedings of the 15th ACM conference on Computer and communications security, Oct. 27, 2008, pp. 279-288.

Kang, et al., "Web-based Automated Black-Box Testing Framework for Component Based Robot Software", In Proceedings of the ACM Conference on Ubiquitous Computing, Sep. 5, 2012, 8 pages.

Michael, et al., "Black Box Security Testing Tools", https://www.us-cert.gov/bsi/articles/tools/black-box-testing/black-box-security-testing-tools, Published on: Dec. 28, 2005, 31 pages.

\* cited by examiner

TRAFFIC REPLAY TO DETECT INTERFACE CHANGES

TECHNICAL BACKGROUND

Various software constructs have been developed that communicate with network clients, end users, and associated computing systems. These software constructs include software interfaces, software modules, and other elements that can interact with the end users and often produce data that is transferred back to the end users. For example, web services can include various interfaces and processing elements that handle traffic and requests for user traffic and network-based web clients. Web services can include application programming interfaces (APIs) for clients to communicate with underlying core software packages over network-based interfaces. The core software packages can provide various functionality to end users, such as productivity applications, billing services, storage services, computing services, or other functionality. Many times, these interfaces and portions of the core software packages might be considered 'legacy' code which has been operating for many users over an extended timeframe. It can be difficult to modify this legacy code for interfaces and other software services and still ensure that existing clients and customers do not experience bugs or degraded behavior after changes are implemented.

OVERVIEW

Systems, methods, apparatuses, and software for software testing systems in computing environments are provided herein. In one example, software modules are instantiated within an enveloping framework for replaying or recording of user activity with regards to the software modules. Based at least on the enveloping framework placed in a replay mode of operation, the enveloping framework provides replayed inputs to the software modules based on previously recorded user activity, the replayed inputs each associated with unique identifiers mapping into the previously recorded user activity. The enveloping framework monitors outputs from the software modules and correlates the outputs to the inputs using the unique identifiers. Changes are detected in operation of the software modules based in part on a comparison of previously recorded outputs from the software modules to the outputs that are determined by the software modules when using the replayed inputs.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

In developing web services that communicate with software clients, it is often desired to maintain the same output for a given input, to avoid breaking software clients that depend on a legacy service. The implementations herein can capture actual user client activity or traffic and store for later replay. This "pre-recorded" traffic can be replayed to a different instance of a target service to determine changes to the target service and associated interfaces, and to determine what the impact of those changes are. The examples herein include mechanisms for recording and replaying traffic as well as specific testing scenarios for detecting service interface changes, such as changes to application programming interfaces (APIs) to various software services. Thus, legacy code can be tested as a "black box" without knowledge of internal implementation details. Advantageously, the examples herein can test new versions or builds of code by replaying traffic and comparing with persisted traffic. Technical effects include increased testing efficiency, the ability to do regression testing on network/software interfaces to software services without internal knowledge of the interfaces, faster development of software services by detecting code changes that break existing interfaces to the software services, and emulating behavior of externally accessed services, among others.

In software modules used in various software services and programs, methods are typically blocks of code which are called by a software system to achieve a piece of a particular task. Methods take in inputs and return outputs, and the outputs can then serve as the inputs to other methods or be delivered to clients or end users. Some methods do not return any output, but instead change a state of a software system. An entire software system can be comprised of a collection of various methods being called. When a request is made to the software system, a processor thread serves this request, and calls one or more associated methods that return associated responses. Thus, the lifetime of any given request can begin with the call to the system (along with any associated inputs) and ending with one or more outputs or state changes indicated in a response.

In object oriented programming, methods are typically contained in classes. A class can be a logical implementation of a 'skeleton' called an interface. In the examples herein, traffic replay can be achieved by intercepting calls to methods of classes, and comparing inputs and outputs of the intercepted methods with recorded traffic. The recorded traffic can be previously monitored over a period of time and persisted in one or more data records. Moreover, external dependencies, such as partner services, non-tested services, and other software elements can be emulated or 'mocked' efficiently.

Figure 1:
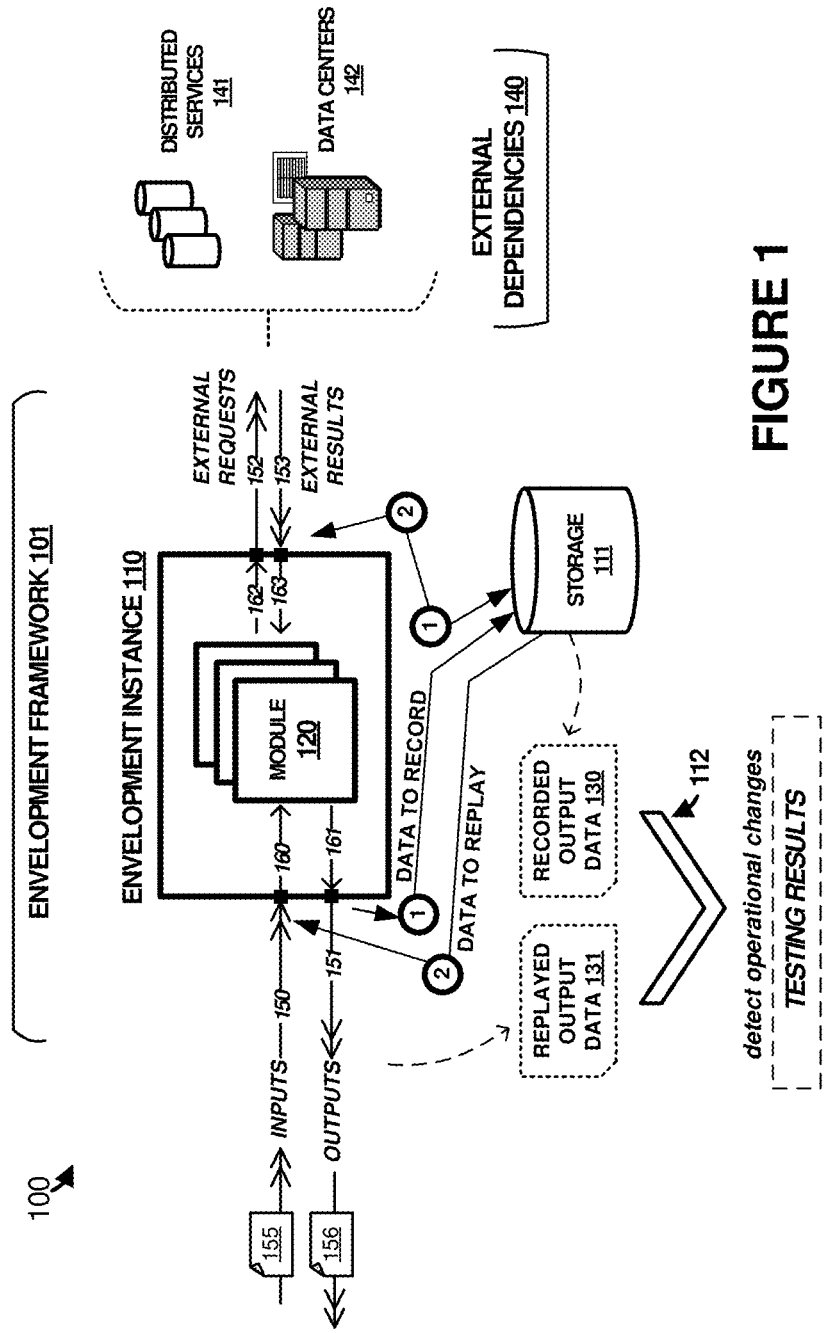
FIG. 1 illustrates a software environment in an implementation.

As a first example of a software testing environment, FIG. 1 is presented. FIG. 1 illustrates software environment 100. Environment 100 includes envelopment framework 101 that further comprises one or more envelopment instances 110 with associated software modules 120, storage system 111, and comparison service 112. Environment 100 also includes traffic inputs 155, traffic outputs 156, and external dependencies 140 that might comprise distributed services 141 and data centers 142. In many examples, envelopment framework 101 comprises a cloud computing platform or cloud computing service that may include one or more virtualized elements.

In operation, modules 120 can be instantiated for use by one or more users or clients. These users or clients might interact with modules 120 or interact with other services or software elements by way of modules 120—such as when modules 120 comprise interface modules. Client access to one or more external dependencies, such as partner services, might be achieved using modules 120. In FIG. 1, these external dependencies include distributed services 141 and data centers 142, although other elements can be included. Envelopment framework 101 can be employed to both record and replay traffic related to usage of modules 120 and external dependencies 140.

Figure 2:
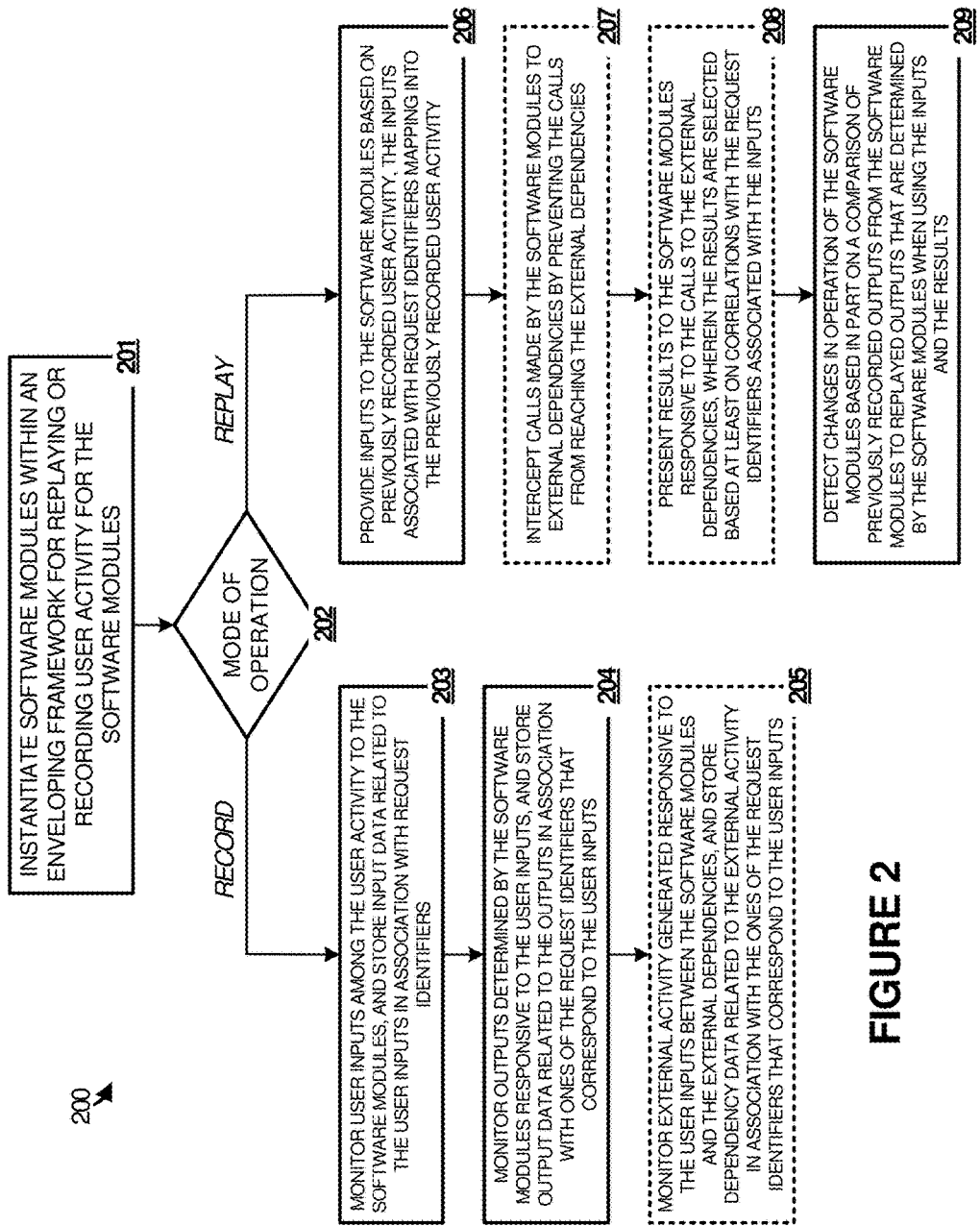
FIG. 2 illustrates software testing processes in an implementation.

A detailed explanation of example operations of the elements of system 100 is included in FIG. 2. FIG. 2 is a flow diagram illustrating these example operations, and associated portions of the operations are referenced below with parentheses.

In FIG. 2, envelopment framework 101 instantiates (201) software modules 120 within envelopment framework 101 for replaying or recording user activity for one or more of software modules 120. The instantiation process includes wrapping modules 120 within a 'shell' or envelopment instance 110 that includes one or more of modules 120. Although a single envelopment instance 110 might be employed for more than one module 120, it should be understood that multiple envelopment instances can be employed, such as one per module 120, or one per client, among other arrangements.

Envelopment framework 101 includes one or more envelopment instances 110 that provide for monitoring of input and output traffic with relation to modules 120. This input and output traffic can include client input traffic 155 and client output traffic 156 carried over links 150-151. Input traffic is presented to inputs 160 of modules 120, and output traffic is presented by modules 120 over outputs 161. This input and output traffic can also include external dependency traffic, such as external requests and replies/results, carried over links 152-153.

During initiation of the envelopment process, a user, administrator, or automated testing service might indicate a mode of operation (202) used in instantiating envelopment instances 110. This mode of operation can include an indication or flag that instructs each envelopment instance 110 to be in a recording mode or a replaying mode. When in a recording mode, the associated envelopment instance 110 monitors and stores inputs, outputs, and external dependency traffic. When in a replaying mode, the associated envelopment instance 110 retrieves inputs from storage system 111 and replays various activities with relation to modules 120. Also, when in a replaying mode, the associated envelopment instance 110 can emulate behavior of the one or more external dependencies, as will be discussed in more detail below.

Turning first to the 'recording mode' of operation, envelopment framework 101 monitors (203) user inputs among the user activity to the software modules, and stores input data related to the user inputs in association with transactional identifiers. As indicated by operations '1' in FIG. 1, envelopment instance 110 monitors and stores incoming traffic directed to modules 120, such as input traffic 155. The input traffic can be stored in one or more data structures within storage system 111. This input traffic can include user or client requests, input data, or other information and activities. Moreover, this input traffic is typically stored as being correlated or associated with a transactional identifier that might comprise a unique identifier or request-specific identifier, to arrange input traffic into a transactional arrangement. Typically, the users or clients will be accessing methods or processes of modules 120, and can make one or more calls to these methods or processes using associated input traffic.

Responsive to receiving the input traffic, modules 120 can process the input traffic to determine associated responses, which might include data manipulation, data processing, interface replies, state modification, or other actions. Moreover, modules 120 might be interfaces to further modules or might employ external dependencies to determine one or more outputs or state changes. Envelopment framework 101 also monitors (204) outputs determined by software modules 120 responsive to the user inputs, and stores output data related to the outputs in association with ones of the request identifiers that correspond to the user inputs. Output traffic is monitored by envelopment framework 101, and this output traffic is stored in one or more data structures of storage system 111. Moreover, this output traffic is typically stored as being correlated or associated with portions of the input traffic. A unique identifier or request-specific identifier can be employed to correlate specific input traffic to specific output traffic in a transactional arrangement.

When external dependencies are employed, envelopment framework 101 monitors (205) external activity generated responsive to the user inputs between software modules 120 and external dependencies 140, and stores dependency data related to the external activity in association with the ones of the request identifiers that correspond to the user inputs. The external dependency traffic can include outputs from modules 120 and inputs received from external dependencies 140. In some examples, this traffic takes the form of one or more requests and replies or results. Other traffic arrangements are possible. This external dependency traffic is monitored by envelopment framework 101, and this external dependency traffic is stored in one or more data structures of storage system 111. Moreover, this external dependency traffic is typically stored as being correlated or associated with portions of the client-side input traffic and output traffic. The unique identifiers or request-specific identifiers can be employed to correlate specific client-side input traffic/output traffic to specific external dependency traffic in a transactional arrangement.

Thus, envelopment framework 101 can employ one or more envelopment instances 110 to encapsulate various software modules 120 for monitoring and recording of any activity and traffic that crosses a 'border' established by the individual envelopment instances 110. This activity or traffic can include client-side traffic (i.e. traffic 155-156) or 'back-end' external dependency traffic. Once this traffic has been recorded, indications of the traffic, such as data related to the traffic or portions of the traffic necessary to re-create the traffic at a later time are stored within one or more data structures of storage system 111. Unique identifiers or transaction-specific identifiers can be employed to relate input activity, output activity, and external dependency activity to each other for each individual client transaction or process.

This activity is recorded for later use in testing the operation of modules 120. Many times, modules 120 can change or companion software elements can change for which modules 120 act as interfaces. These changes might include development processes, such as adding new features, fixing bugs or erratic behavior, or other modifications to the affected software modules. It can be difficult to determine if the changes have impacted modules 120 in a negative way, such as by breaking previously working behavior or introducing bugs or other problems. For example, modules 120 might act as interfaces (such as APIs) to further software services included in external dependencies 140. As external dependencies 140 are changed, revised, or updated over time, a developer or associated interface system might want to ensure that modules 120 still function as expected or as in the past. This can especially be relevant when modules 120 are legacy interfaces or interface with legacy clients to which code changes are not desired to be made without fear of introducing undesired behavior in the interfaces or in the clients.

New versions of modules 120 or other elements can be made available, such as when changes are made to the underlying code, operation, or structure of modules 120 or associated external dependencies. A replay mode can be provided by envelopment framework 101 to test operation of modules 120 with regards to old traffic that was previously recorded and verified as working well with previous versions of modules 120 or associated external dependencies. A set of user or client traffic can be captured by envelopment framework 101 and stored in storage system 111 for later replay. This set of client traffic can include a predetermined amount of traffic, or an amount of traffic that stimulates a predetermined number of features, inputs, outputs, or other behaviors of each module 120.

For a 'replay' mode of operation, step 201 of FIG. 2 can be repeated. Specifically, envelopment framework 101 instantiates (201) software modules 120 within envelopment framework 101 for replaying user activity for one or more of software modules 120. The instantiation process includes wrapping modules 120 within a 'shell' or envelopment instance 110 that includes one or more of modules 120. Envelopment framework 101 includes one or more envelopment instances 110 that provide for replaying of input traffic with relation to modules 120. This input traffic can include previously recorded client input traffic. This replayed traffic can also include emulated external dependency traffic, such as external requests and replies/results.

During initiation of the envelopment process, a user, administrator, or automated testing service might indicate a mode of operation (202) used in instantiating envelopment instances 110. This mode of operation can include an indication or flag that instructs each envelopment instance 110 to be in a replaying mode. When in the replaying mode, the associated envelopment instance 110 retrieves inputs from storage system 111 and replays various activities with relation to modules 120. Also, when in a replaying mode, the associated envelopment instance 110 can emulate behavior of the one or more external dependencies, as will be discussed in more detail below.

Turning now to further operations of the 'replay mode' of operation, envelopment framework 101 provides (206) inputs to software modules 120 based on previously recorded user activity, such as that discussed above in operations 203-205. The operations labeled with '2' in FIG. 1 can indicate portions of this replay process. In storage system 111, a transactional record of inputs, outputs, and dependencies can be stored in association with a transaction identifier, which might comprise a unique identifier, request identifier, or other identifiers. Each of the identifiers map into previously recorded user activity.

Recorded input data is applied as inputs to instantiated ones of modules 120. This input data is used to replay activity for modules 120 and can be introduced into inputs 160 of modules 160. Responsive to the input data, modules 120 can produce one or more outputs from the replayed inputs, indicated by replayed output data 131 in FIG. 1. This replayed output data 131 is compared to recorded output data 130 that was previously monitored and stored in storage system 111. To determine which recorded output data should be used to compare to replayed output data 131, the transactional identifiers can be employed. For example, when input data is applied to modules 120, an identifier associated with the input data can be used to also retrieve output data that is expected for that particular input data. The output data can be stored in association with the identifiers, and thus retrieval can occur once input data is selected to application to modules 120 during a replay process.

In addition to inputs and outputs, various external dependencies might be employed by modules 120 to further process data, retrieve results, or perform other various processes and functions. The external dependencies might not always be available for replay, and in some cases the external dependencies might not be desired to be involved in replay traffic. This can be especially relevant when the external dependencies might include financial transaction systems or other stateful system that would be confused by additional customer traffic during replay activities. To prevent failure of external dependencies or to prevent unwanted traffic to the external dependencies, envelopment framework 101 provides for emulation of the external dependencies during replay.

Specifically, envelopment framework 101 intercepts (207) calls made by software modules 120 to external dependencies 140 by preventing the calls from reaching external dependencies 140. Envelopment framework 101 processes these calls and determines what results/replies to present back to modules 120 responsive to the calls. Envelopment framework 101 presents (208) results to software modules 120 responsive to the calls to the external dependencies, wherein the results are selected based at least on correlations with the identifiers associated with the inputs. In FIG. 1, external requests are monitored/intercepted over outputs 162 and emulated replies/responses are presented over inputs 163.

To determine what each result/reply that envelopment framework 101 should provide back to modules 120, various processes can be performed. In a first example, envelopment framework 101 monitors content of the request or call issued by module 120 and based on the content can correlate the content to a set of input data applied to module 120. This set of input data can correspond to a transactional identifier which is used to retrieve a result/reply from storage system 111 for presentation to modules 120 as a result/reply. In another example, only one set of inputs is presented at any given instance to modules 120, and thus the identifier associated with that set of inputs will automatically correspond to the external dependency result/reply retrieved for the set of inputs and stored in association with the identifier. Regardless of the method used to correlate the external requests issued by modules 120 to the emulated responses/replies, envelopment framework 101 can determine a proper emulated behavior based on previously recorded activity and thus modules 120 can be unaware of the emulation status.

Envelopment framework 101 detects (209) changes in operation of software modules 120, such as by employing process 112 to produce testing results. Envelopment framework 101 detects these changes based in part on a comparison of previously recorded outputs 130 from the software modules to replayed outputs 131 that are determined by software modules 120 when using the replayed inputs and any appropriate results for emulated external dependencies. As mentioned above, to determine which recorded output data should be used to compare to replayed output data 131, the transactional identifiers can be employed. For example, when input data is applied to modules 120, an identifier associated with the input data can be used to also retrieve output data that is expected for that particular input data. The output data can be stored in association with the identifiers, and thus retrieval can occur once input data is selected to application to modules 120 during a replay process.

Testing results can comprise indications of what replayed output data varies from the recorded output data for particular sets of inputs or external dependency data. The testing results can be provided to a user, administrator, or to a scripting or automated system that initiates the testing process comprising steps 201-209 above. Differences in operation can be detected and alerted to a development team for resolution of the differences.

Returning to the elements of FIG. 1, elements of envelopment framework 101 can include communication interfaces, network interfaces, processing systems, computer systems, microprocessors, storage systems, storage media, or some other processing devices or software systems, and can be distributed among multiple devices or across multiple geographic locations. Examples of elements of envelopment framework 101 can include software such as an operating system, applications, logs, databases, utilities, drivers, networking software, scripting software, testing elements, and other software stored on a computer-readable medium. Elements of envelopment framework 101 can comprise one or more platforms which are hosted by a distributed computing system or cloud-computing service. Elements of envelopment framework 101 can comprise logical interface elements, such as software defined interfaces and Application Programming Interfaces (APIs) for users or administrators to interact with envelopment framework 101.

Elements of envelopment framework 101 include one or more envelopment instances 110 and storage system 111, among other elements. Envelopment instances 110 can include one or more software encapsulation elements that can instantiate one or more software modules comprising classes, methods, and other elements. Envelopment instances 110 each have monitoring elements for monitoring inputs and outputs of the encapsulated software elements. Envelopment instances 110 each have selectable traffic injection elements that can receive traffic from storage system 111 during replay processes or from clients/users or external dependencies during recording processes.

Storage system 111 comprises one or more storage elements, such as servers, storage drives, or other data storage elements. In some examples, storage system 111 is an interface to further storage elements, such as distributed storage systems, and comprises communication interfaces to communicate with data centers, which can include communication equipment or software that is specialized for particular ones of the data centers. In some examples, storage system 111 comprises distributed computing elements that are initiated or spawned on-demand to service traffic recording and replay requests by envelopment framework 101. Storage system 111 can comprise application servers, storage servers, web servers, email servers, and can be deployed over distributed or cloud computing platforms which provides data or communication services. Data centers 120-122 can store content or data for delivery to user devices, which can include database 125 or portions thereof.

External dependencies 150 can each comprise application servers, storage servers, web servers, email servers, and can be deployed over distributed or cloud computing platforms which provides data or communication services. Distributed services 141 can provide computing or processing services to modules 120 or end users. Data centers 142 can store content or data for delivery to modules 120 or end users.

Links 150-153, along with other links not shown among the elements of FIG. 1 for clarity, can each comprise one or more communication links, such as one or more network links comprising wireless or wired network links. The links can comprise various logical, physical, or application programming interfaces. Example communication links can use metal, glass, optical, air, space, or some other material as the transport media. The links can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. The links can be direct links or may include intermediate networks, systems, or devices, and can include a logical network link transported over multiple physical links.

Figure 3:
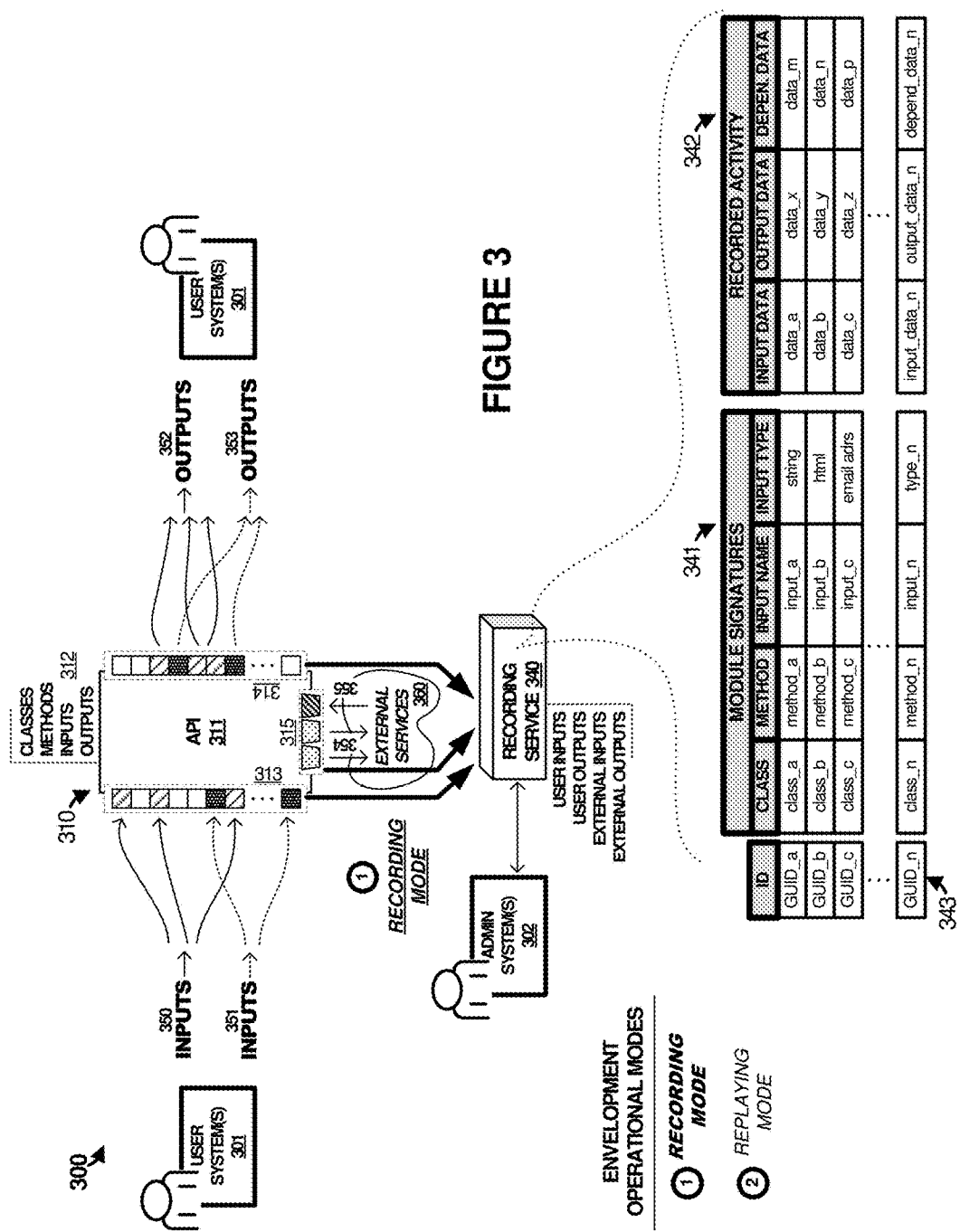
FIG. 3 illustrates a software environment and traffic recording operations in an implementation.
Figure 4:
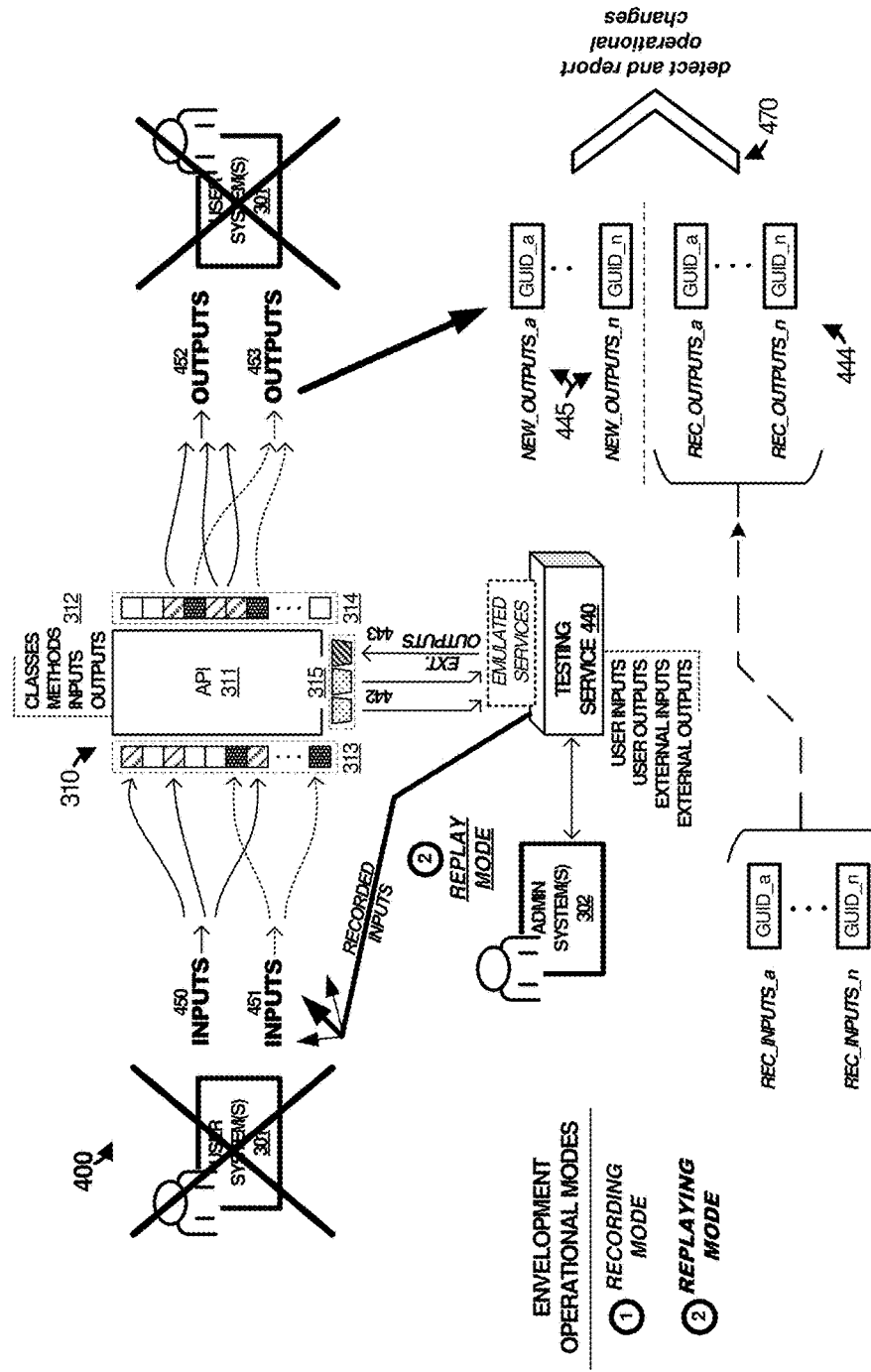
FIG. 4 illustrates a software environment and traffic replay operations in an implementation.

As further examples of encapsulation-based testing for software modules, FIGS. 3 and 4 are presented. FIG. 3 illustrates an example system 300 and associated operations related to traffic recording for an example software module. FIG. 4 illustrates an example system 400 and associated operations related to traffic replay and testing for an example software module. Although the example software module comprises an API in FIGS. 3 and 4, it should be understood that the operations and enhancements can apply to any target software modules.

Turning first to system 300 in FIG. 3, various user systems 301 are included that interact with application programming interface (API) 311 using a plurality of inputs 350-351 and outputs 352-353. Although user systems 301 are shown twice in FIG. 3, it should be understood that this arrangement can include the same user systems. API 311 provides user-facing operations and interfaces, such as logical network links, packet links, sockets, ports, or other physical or logical interfaces for users to interact with elements of a software service. The software service can include those indicated for external services or others not shown in FIG. 3 for clarity. API 311 can comprise one or more methods that are contained in one or more classes. In some examples, API 311 comprises one or more function calls configured to receive user commands, user requests, or other communications in a standardized format for interacting with elements of a software service.

In operation, user systems 301 can issue one or more calls to API 311 that comprise inputs 350-351. These inputs can be used by API 311 to drive further activity, such as by enabling interaction between the user systems and one or more software services, various processing within API 311 itself, or state modification related to API 311, among other actions. API 311 can transfer output data 352-353 related to the input data to user systems 301, such as to report status, provide data that was requested in the inputs, provide access to services, or other information and data. As a part of the features of API 311, one or more further software services might be employed, such as external services 360. External services 360 can comprise various software services for user by users 301, such as productivity applications, billing services, web services, email services, storage services, media services, or other services, including combinations thereof. Outputs 352-353 can be related to both inputs 350-351 and activities of external services 360. API 311 can make one or more calls or requests to external services 360 over request links 354 and can receive one or more responses or data from external services 360 over links 355.

However, API 311 might be revised by systems that maintain or enhance operation of API 311 over time, which might include new versions or releases of API 311. For example, API 311 might initially comprise a first version and subsequently be updated to a second version. It can be difficult to determine if the second version of API 311 affects end users as well as interactions with external services 360. Moreover, sometimes API 311 might include legacy code or legacy portions that are not modified during revision, and a developer might desire to check if the revisions affect the legacy portions in a negative manner. Advantageously, the examples found in FIGS. 3 and 4 provided enhanced frameworks and operations to not only capture past behavior of API 311 but also test later revisions to API 311 using replayed traffic.

FIG. 3 illustrates capture and recording of activities surrounding actual user interaction with API 311 and external services 360. FIG. 4 illustrates replay and testing of API 311 using this recorded activity. To indicate a recording mode, one or more indicators can be passed by administrator systems 302 into envelopment framework 310. Envelopment framework 310 then responsively enters a recording mode or a replay mode based on the one or more indicators.

For both recording and replay activities, API 311 is encapsulated into envelopment framework 310 by at least instantiating any classes associated with API 311 into envelopment framework 310. Since the classes further include various software methods of API 311 that actually perform activities to be monitored, then those methods will also be encapsulated by envelopment framework 310. In FIG. 3, envelopment framework 310 is represented by input encapsulation elements 313, output encapsulation elements 314, and external services encapsulation elements 315. These encapsulation elements form a 'border' around API 311. In a recording mode, this border around API 311 can monitor and capture any activity that crosses the border. In a replay mode, this border around API 311 can also provide various functionality to reintroduce recorded user inputs, monitor associated outputs, and emulate external services activities, as will be seen later in FIG. 4.

As seen in FIG. 3, recording service 340 captures and records user inputs, user outputs, external services inputs, and external services outputs, among other associated traffic that affects the borders or boundaries of API 311. Thus, envelopment framework 310 captures request and response activity at entry points and exit points of API 311. Incoming requests/traffic can be captured by recording service 340 which receives data representative of the request and response activities and stores the data into one or more data structures in a storage system. A baseline revision or build of API 311 can be used to initially record the traffic/activities, and this can be later compared to other later revisions. External dependencies, such as platform partners, software services, distributed computing services, distributed storage services, or other services and platforms, can interact with API 311. This activity can also be captured by recording service 340. However, testing of external services 360 is not typically a goal of the envelopment framework discussed herein. Instead, only the activities that are crossing the encapsulation border for API 311 are of relevance. To remove the requirement of having external services 360 during later replay activities, recording service 340 can capture and record any traffic exchanged between API 311 and external services 340.

Data structures 341-342 store information and data recorded by recording service 340. Data structures 341-342 arrange this data according to at least an identifier. In this example, the identifier comprises a unique identifier, such as a globally unique identifier (GUID) indicated in column 343. Each row of the data structures is associated with a GUID, and this GUID can be used during later replay activities to associate inputs with corresponding outputs and external service activity. For every input/request coming in to envelopment framework 310, recording service 340 can group all of the recorded requests and responses into one file and use this identifier to mark this file.

In a 'real' production environment, API 311 can have actual user traffic from user systems 310 calling API 311. When a 'record' mode of operation is initiated, then envelopment framework 310 captures all activity/traffic that crosses the encapsulation border around API 311. The associated requests and responses for the traffic can be grouped together with corresponding calls to external services 360 and recorded into a data file. Then these files can be held in non-transitory, non-volatile, storage for later use. For every recorded set of request and response (along with any external service traffic), a unique identifier is assigned to each set. In this example, a GUID arrangement is employed as identifiers, which might comprise an example identifier pattern as "3F8C9DDE-F968-4256-87D5-54C58D42BA78," among others.

After recording service 340 records enough real user traffic, then this user traffic can be stored for later testing processes. What determines the quantity of 'enough' real user traffic can vary. In some examples, once all permutations of inputs and outputs are stimulated by user traffic, then enough real user traffic has been captured. In other examples, a predetermined time window can be employed to ensure that enough user traffic has been captured. In yet other examples, API 311 might include a discrete number of functions, inputs, outputs, and external service calls that are possible. Once all of these have been targeted sufficiently by user traffic, then recording service 340 can determine that enough user traffic has been captured. Other examples quantities of user traffic can be established.

The transactional nature of user traffic can have an associated 'lifetime' where a request is issued by a user system to API 311, and API services the request—many times using external services 360—and then API 311 provides a response back to the user system. Each of these transactions can thus have a particular ID associated therewith, and the appropriate elements 312 of API 311 that are involved in the transaction can also be indicated as corresponding to the particular ID.

Turning to a quick discussion on data structures 341-342, each column indicates elements 312 of API 311, namely a class name, method name, input name, and input type for data structure 341. These are all organized into a row arrangement to indicate sets of elements of API 311 that are implicated for a particular transaction. Recorded user traffic/activity is then associated with the sets indicated by a row of data structure 341. For example, a set of recorded user activity for a particular transaction indicates user input data (e.g. data_a, . . . ), response/output data (e.g. data_x, . . . ), and external services dependency data (e.g. data_m, . . . ). The actual recorded data for each individual user transaction can be associated with the elements of API 311 (i.e. the particular classes, methods, and inputs of API 311) that are stimulated by the transaction. Moreover, the unique identifier (ID) is associated with each row/transaction to uniquely identify and associate each of the classes, methods, and inputs of API 311 to the recorded user traffic.

Data structures 341-342 can comprise a mapping among the elements 312 of API 311 and the recorded user activity. The elements of API 311 can be combined to form a 'signature' of each transaction that indicates what portions of API 311 were affected by each transaction. More than one class, method, input, or output might be affected in a single transaction, and thus the simplified data structures 341-342 might be expanded to include multiple 'rows' or sets of signatures for each transaction and recorded set of user data.

Turning next to system 400 in FIG. 4, various user systems 301 are no longer included to interact with application programming interface (API) 311 using the plurality of inputs 350-351 and outputs 352-353. Instead, a replay of past activities, transactions, traffic, or other processes is presented to API 311 using encapsulation framework 310.

As with the recording processes, when encapsulation framework 310 is placed into a replay operational mode by administrator systems 302, API 311 is encapsulated into envelopment framework 310 by at least instantiating any classes associated with API 311 into envelopment framework 310. Since the classes further include various software methods of API 311 that actually perform activities to be tested, then those methods will also be encapsulated by envelopment framework 310. In FIG. 4, envelopment framework 310 is represented by input encapsulation elements 313, output encapsulation elements 314, and external services encapsulation elements 315. These encapsulation elements form a 'border' around API 311. In a replay mode, this border around API 311 can inject input traffic, monitor output traffic, and emulate external services traffic for API 311.

Once replay processes have been initiated by admin systems 302, then testing service 440 can being to replay traffic for API 311. This traffic can be stored in one or more storage systems, and held in various data records, such as those indicated in FIG. 3. Each transaction indicated by the data records can be replayed to API 311 in sequential order. Each transaction can have an associated unique ID for the transaction, and have associated input data, output data, and external services data that had been previously recorded. The input data is fed to API 311 which responsively determines one or more outputs based on this input data.

However, external services 360 might have originally been involved in determining the output data by API 311. In order to prevent the need for these external services to be involved in the replay activities, testing service 440 can emulate the behavior of external services 360. Testing service 440 can retrieve dependency data associated with the external services that are associated with the input data for a particular transaction, as indicated by the particular unique ID for that transaction. This dependency data can be presented to API 311 in response to a request issued by API 311 for external services 360. For example, API 311 might issue one or more requests or calls 441 which are intercepted by an emulation portion of testing service 440 and prevented from reaching the external services. The emulation portion can process the requests 441 and determine which responses and response data to present back to API 311 in response 443. The unique IDs can be used to associated each request 442 with each response 443.

For each of the replayed outputs determined by testing service 440, previously recorded outputs are used to compare operation of API 311. Testing service 440 correlates recorded output data to replayed output data using the unique IDs. For example, each transaction/set of input data has an associated unique ID associated therewith, and this unique ID can be used to retrieve recorded output data that corresponds to the input data. Once replayed output data is available for this transaction, the replayed output data can be compared to the recorded output data. In FIG. 4, recorded inputs 441 each have an associated GUID and can be used to retrieve corresponding recorded outputs 444. Once the recorded inputs have been applied to achieve replayed or 'new' outputs 445, then comparison process 470 can be employed to determine differences in the recorded outputs versus the replayed outputs. The replayed outputs are typically derived from a later revision of API 311 than the recorded outputs that are derived from a baseline revision. Thus, any differences in output between the recorded/baseline outputs and the replayed/new outputs can indicate differences in operation of API 311 between the revisions.

Testing service 440 can indicate these differences, or lack thereof, to admin systems 302 or other systems. Testing service 440 might provide only alerts to output mismatches between the recorded and replayed outputs, or might provide results for all replayed outputs as compared to the baseline recorded outputs. Other indications can be provided to admin systems 302.

Advantageously, aberrant behavior or unexpected behavior in API 311 can be detected using the recording and replaying frameworks discussed herein. Moreover, once API 311 has been baselined, then any future revision to all or a part of API 311 can be efficiently tested using real user traffic to determine operational deviances.

When external services are employed by API 311, these external services can be emulated by intercepting the calls and associated traffic directed to the external services and preventing delivery of the traffic to the external services. Appropriate responses can be provided to API 311 to emulate behavior of the external services. This emulated behavior is also useful when an external service holds state. For example, if the external service comprises a billing system or billing service, once a user has been billed for a product during capture of user traffic during a recording phase, testing service 440 does not desire to bill the user again during replay phases. Advantageously, during the replay phase external services, such as billing systems, are not called upon. Instead, recorded reply data is provided as-needed to API 311 to ensure proper response as if the emulated behavior was provided by the external service.

If the input and output to the external service contains some sensitive information, like credit card details, medical identifiers, government identifiers, or other information, recording service 340 and testing service 440 can still handle such data. One example way to handle sensitive data is to hash such data (or all user data) before persisting in the data records. When this data is applied to API 311 during replay operations, the hashed data can be un-hashed for temporary replay usage. In other examples, the hashed data can be applied directly for use by API 311. In further examples, the sensitive user data can be encrypted for storage during recording phases, and decrypted for replay operations. In yet further examples, the sensitive user data can be obfuscated prior to storage so that no sensitive data remains.

Figure 5:
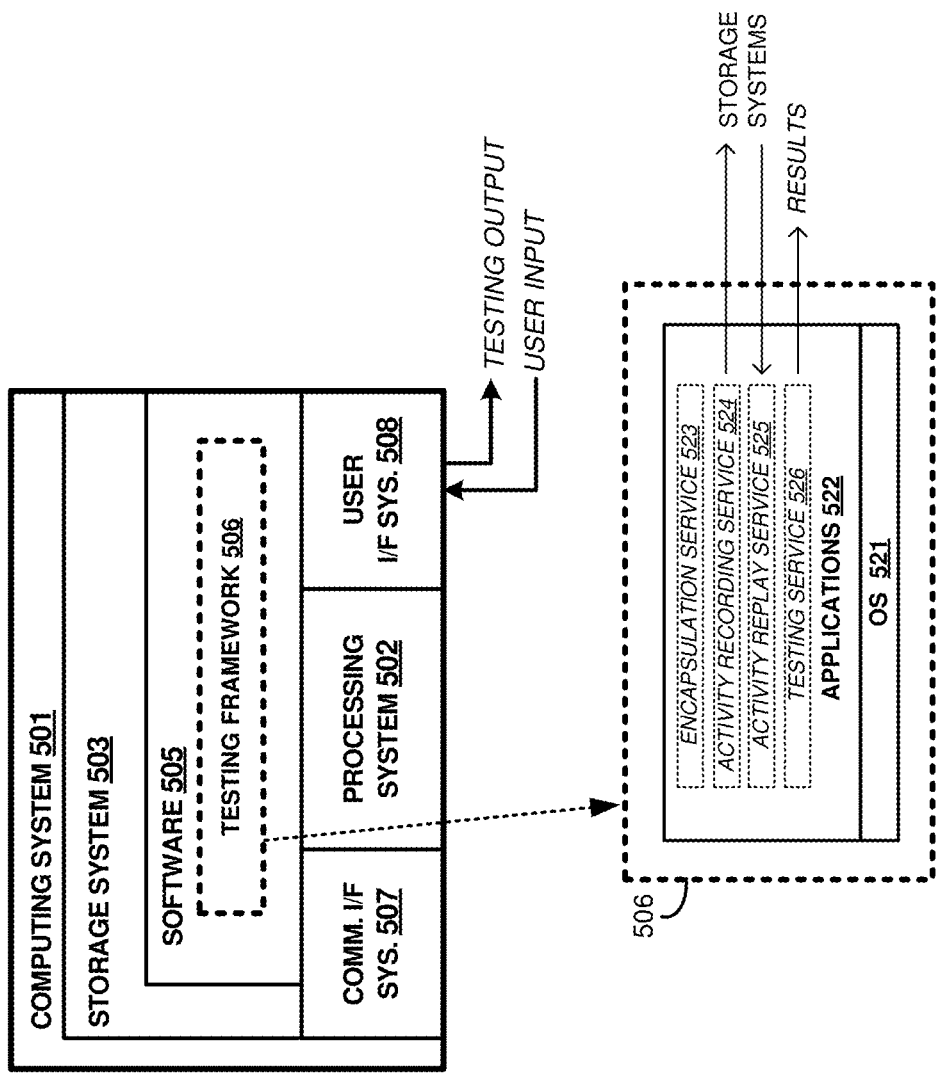
FIG. 5 illustrates a computing system suitable for implementing any of the architectures, processes, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of the elements of FIG. 1, such as envelopment framework 101 of FIG. 1, envelopment framework 310 or testing service 340 of FIG. 3.

Examples implemented by computing system 501 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 501 are implemented on user devices, example devices include smartphones, laptop computers, tablet computers, desktop computers, gaming systems, entertainment systems, and the like.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes testing framework 506, which is representative of the processes, services, and platforms discussed with respect to the preceding Figures. When executed by processing system 502 to provide enhanced software testing services among other services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced software testing services among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include testing framework 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide enhanced software testing services among other services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Testing framework 506 includes one or more software elements, such as OS 521 and applications 522. Applications 522 can receive user input, such as user input comprising test initiation, test feedback, or mode selection, among other user input. Applications 522 can include encapsulation service 523, activity recording service 524, activity replay service 525, and testing service 526, or other services which can provide enhanced database services. These elements can describe various portions of computing system 501 with which a user interacts. For example, OS 521 can provide a software platform on which applications 522 are executed.

Encapsulation service 523 can wrap software modules into an enveloped arrangement and provide border-monitoring features to monitor activity that crosses the encapsulation border for the software modules. Activity recording service 524 monitors and records activity that crosses the encapsulation border for the software modules. Activity recording service 524 can interface with one or more storage systems to store the activity in various data records for later replay. Activity replay service 525 injects input traffic to the software modules for replay of past activity that was recorded using activity recording service 524. Activity replay service 525 can also monitor outputs of the software modules for comparison by testing service 526. Activity replay service 525 can also emulate behavior of partner services or external dependencies, so that the software modules can properly respond to the injected inputs provided by activity replay service 525. Testing service 526 compares operation of different revisions of the software modules to detect changes in the behavior or operation of the software modules. Testing service 526 can compare previously recorded outputs for a baseline version of the software modules to replayed outputs from a new version of the software modules. Testing service 526 can report results of the testing/comparison process to one or more users or other systems.

Communication interface system 507 may include communication connections and devices that allow for communication with other computing systems (not shown) over communication networks (not shown). Examples of connections and devices that together allow for inter-system communication may include network interfaces, network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 can receive input and provide output over a network interface, such as communication interface system 507. In network examples, user interface system 508 might include web interfaces and terminal interfaces. User interface system 508 can packetize display or graphics data for remote display by a display system or computing system coupled over one or more network interfaces or web interfaces. Physical or logical elements of user interface system 508 can provide alerts or visual outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface. In further examples, user interface system 508 may include a touchscreen, keyboard, mouse, voice input device, audio input device, or other touch input device for receiving input from a user. Output devices such as a display, speakers, web interfaces, terminal interfaces, and other types of output devices may also be included in user interface system 508.

Communication between computing system 501 and other computing systems, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A computing apparatus comprising one or more computer readable storage media, a processing system operatively coupled with the one or more computer readable storage media, and program instructions stored on the one or more computer readable storage media. When executed by the processing system, the program instructions direct the processing system to at least instantiate one or more software modules within an enveloping framework for replaying user activity to the one or more software modules. The enveloping framework is configured to provide inputs to the one or more software modules based on previously recorded user activity, the inputs associated with request identifiers mapping into the previously recorded user activity, intercept calls made by the one or more software modules to external dependencies by preventing the calls from reaching the external dependencies, and present results to the one or more software modules responsive to the calls to the external dependencies, where the results are selected based at least on correlations with the request identifiers associated with the inputs. The program instructions further direct the processing system to at least detect changes in operation of the one or more software modules based in part on a comparison of previously recorded outputs from the one or more software modules to replayed outputs that are determined by the one or more software modules when using the inputs and the results.

Example 2

The computing apparatus of Example 1, where the one or more software modules comprise application programming interface (API) software methods contained in one or more classes, and where instantiating the one or more software modules within the enveloping framework comprises wrapping the one or more classes in the enveloping framework to selectively record or replay boundary activity for the API software methods.

Example 3

The computing apparatus of Examples 1-2, comprising further program instructions, when executed by the processing system, direct the processing system to at least, based at least on the enveloping framework configured to record the user activity to the one or more software modules: instantiate the one or more software modules within the enveloping framework for recording the user activity associated with the one or more software modules; monitor user inputs among the user activity to the one or more software modules, and store input data related to the user inputs in association with request identifiers; monitor outputs determined by the one or more software modules responsive to the user inputs, and store output data related to the outputs in association with ones of the request identifiers that correspond to the user inputs; and monitor external activity generated responsive to the user inputs between the one or more software modules and the external dependencies, and store dependency data related to the external activity in association with the ones of the request identifiers that correspond to the user inputs.

Example 4

The computing apparatus of Examples 1-3, comprising further program instructions, when executed by the processing system, direct the processing system to at least, during recording of the user activity, form mappings between the request identifiers and sets of user activity values comprising the input data, the output data, and the dependency data, and store the mappings in one or more data structures for replay by the enveloping framework.

Example 5

The computing apparatus of Examples 1-4, comprising further program instructions, when executed by the processing system, direct the processing system to at least, during replay of the user activity, initiate a series of requests comprising the input data to the one or more software modules, and track the replayed outputs using the request identifiers associated with the input data of the series of requests for comparison with the output data to detect the changes in the operation of the one or more software modules.

Example 6

The computing apparatus of Examples 1-5, where the enveloping framework determines whether to replay or to record the user activity with regards to the one or more software modules based at least on an instruction issued to the enveloping framework for instantiation of the one or more software modules.

Example 7

The computing apparatus of Examples 1-6, where the comparison of the previously recorded outputs to the replayed outputs comprises correlating, via the request identifiers, the previously recorded outputs to the replayed outputs.

Example 8

The computing apparatus of Examples 1-7, where a previous version of at least one of the software modules was employed to determine the previously recorded user activity; and where to detect changes in the operation of the one or more software modules, a comparison of behavior of the one or more software modules is performed using the previously recorded user activity.

Example 9

A method of detecting changes in operation of software elements, comprising instantiating one or more software modules within an enveloping framework for replaying user activity to the one or more software modules. The method also includes, in the enveloping framework, providing inputs to the one or more software modules based on previously recorded user activity, the inputs associated with request identifiers mapping into the previously recorded user activity. The method also includes, in the enveloping framework, intercepting calls made by the one or more software modules to external dependencies by preventing the calls from reaching the external dependencies. The method also includes, in the enveloping framework, presenting results to the one or more software modules responsive to the calls to the external dependencies, where the results are selected based at least on correlations with the request identifiers associated with the inputs. The method also includes detecting changes in operation of the one or more software modules based in part on a comparison of previously recorded outputs from the one or more software modules to replayed outputs that are determined by the one or more software modules when using the inputs and the results.

Example 10

The method of Example 9, where the one or more software modules comprise application programming interface (API) software methods contained in one or more classes, and where instantiating the one or more software modules within the enveloping framework comprises wrapping the one or more classes in the enveloping framework to selectively record or replay boundary activity for the API software methods.

Example 11

The method of Examples 9-10, further comprising, in the enveloping framework, based at least on the enveloping framework configured to record the user activity to the one or more software modules: instantiating the one or more software modules within the enveloping framework for recording the user activity associated with the one or more software modules; monitoring user inputs among the user activity to the one or more software modules, and storing input data related to the user inputs in association with request identifiers; monitoring outputs determined by the one or more software modules responsive to the user inputs, and storing output data related to the outputs in association with ones of the request identifiers that correspond to the user inputs; and monitoring external activity generated responsive to the user inputs between the one or more software modules and the external dependencies, and storing dependency data related to the external activity in association with the ones of the request identifiers that correspond to the user inputs.

Example 12

The method of Examples 9-11, further comprising, during recording of the user activity, forming mappings between the request identifiers and sets of user activity values comprising the input data, the output data, and the dependency data, and storing the mappings in one or more data structures for replay by the enveloping framework.

Example 13

The method of Examples 9-12, further comprising during replay of the user activity, initiating a series of requests comprising the input data to the one or more software modules, and tracking the replayed outputs using the request identifiers associated with the input data of the series of requests for comparison with the output data to detect the changes in the operation of the one or more software modules.

Example 14

The method of Examples 9-13, where the enveloping framework determines whether to replay or to record the user activity with regards to the one or more software modules based at least on an instruction issued to the enveloping framework for instantiation of the one or more software modules.

Example 15

The method of Examples 9-14, where the comparison of the previously recorded outputs to the replayed outputs comprises correlating, via the request identifiers, the previously recorded outputs to the replayed outputs.

Example 16

The method of Examples 9-15, where a previous version of at least one of the software modules was employed to determine the previously recorded user activity; and where to detect changes in the operation of the one or more software modules, a comparison of behavior of the one or more software modules is performed using the previously recorded user activity.

Example 17

A computing apparatus comprising one or more computer readable storage media, a processing system operatively coupled with the one or more computer readable storage media, and program instructions stored on the one or more computer readable storage media. When executed by the processing system, the program instructions direct the processing system to at least instantiate one or more software modules within an enveloping framework for replaying or recording of user activity with regards to the one or more software modules based at least on an instruction issued to the enveloping framework for instantiation of the one or more software modules. Based at least on the enveloping framework placed in a replay mode of operation, the program instructions further direct the processing system to at least provide replayed inputs to the one or more software modules based on previously recorded user activity, the replayed inputs each associated with unique identifiers mapping into the previously recorded user activity, and monitor outputs from the one or more software modules and correlate the outputs to the inputs using the unique identifiers. The program instructions further direct the processing system to at least detect changes in operation of the one or more software modules based in part on a comparison of previously recorded outputs from the one or more software modules to the outputs that are determined by the one or more software modules when using the replayed inputs.

Example 18

The computing apparatus of Example 17, comprising further program instructions, that when executed by the processing system, direct the processing system to at least, based at least on the enveloping framework placed in a record mode of operation, instantiate the one or more software modules within the enveloping framework for recording the user activity associated with the one or more software modules, monitor user inputs among the user activity to the one or more software modules, and store input data related to the user inputs in association with the unique identifiers, and monitor outputs determined by the one or more software modules responsive to the user inputs, and store output data related to the outputs in association with ones of the unique identifiers that correspond to the user inputs.

Example 19

The computing apparatus of Examples 17-18, comprising further program instructions, that when executed by the processing system, direct the processing system to at least, based at least on the enveloping framework placed in the replay mode of operation, intercept calls made by the one or more software modules to external services by withholding the calls to the external services and emulating behavior of the external services by at least presenting results to the one or more software modules responsive to the calls to the external services, where the results are selected based at least on correlations with the unique identifiers associated with the replayed inputs.

Example 20

The computing apparatus of Examples 17-19, where the enveloping framework determines whether to replay or to record the user activity with regards to the one or more software modules based at least on an instruction issued to the enveloping framework for instantiation of the one or more software modules, where the comparison of the previously recorded outputs to the replayed outputs comprises correlating, via the unique identifiers, the previously recorded outputs to the replayed outputs, and where a previous version of at least one of the software modules was employed to determine the previously recorded user activity; and where to detect changes in the operation of the one or more software modules, a comparison of behavior of the one or more software modules is performed using the previously recorded user activity.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A computing apparatus comprising:
one or more computer readable storage media;
a processing system comprising a processor operatively coupled with the one or more computer readable storage media; and
program instructions stored on the one or more computer readable storage media, that when executed by the processing system, direct the processing system to at least:
instantiate at least classes associated with one or more software modules within an enveloping framework that forms an encapsulation border for interception of inputs to the one or more software modules and outputs from the one or more software modules;
the enveloping framework configured to:
provide the inputs to the one or more software modules based on previously recorded user activity, the inputs associated with request identifiers mapping into the previously recorded user activity;
intercept the outputs comprising calls made by the one or more software modules to external dependencies by preventing the calls from reaching the external dependencies;
present results to the one or more software modules responsive to the calls to the external dependencies, wherein the results are selected based at least on correlations with the request identifiers associated with the inputs; and
detect changes in operation of the one or more software modules based in part on a comparison of previously recorded outputs from the one or more software modules to replayed outputs that are determined by the one or more software modules when using the inputs and the results.

2. The computing apparatus of claim 1, wherein the one or more software modules comprise application programming interface (API) software methods contained in one or more classes, and wherein instantiating at least the one or more classes associated with the one or more software modules within the enveloping framework comprises wrapping the one or more classes in the enveloping framework to selectively record or replay boundary activity for the API software methods comprising the inputs and the outputs.

3. The computing apparatus of claim 1, comprising further program instructions, when executed by the processing system, direct the processing system to at least:
based at least on the enveloping framework configured to record the user activity to the one or more software modules:
instantiate at least the classes associated with the one or more software modules within the enveloping framework for recording the user activity associated with the one or more software modules;
monitor user inputs among the user activity to the one or more software modules, and store input data related to the user inputs in association with corresponding request identifiers;
monitor outputs determined by the one or more software modules responsive to the user inputs, and store output data related to the outputs in association with ones of the request identifiers that correspond to the user inputs; and
monitor external activity generated responsive to the user inputs between the one or more software modules and the external dependencies, and store dependency data related to the external activity in association with the ones of the request identifiers that correspond to the user inputs.

4. The computing apparatus of claim 3, comprising further program instructions, when executed by the processing system, direct the processing system to at least:
during recording of the user activity, form mappings between the request identifiers and sets of user activity values comprising the input data, the output data, and the dependency data; and
store the mappings in one or more data structures for replay by the enveloping framework.

5. The computing apparatus of claim 4, comprising further program instructions, when executed by the processing system, direct the processing system to at least:
during replay of the user activity, initiate a series of requests comprising the input data to the one or more software modules, and track the replayed outputs using the request identifiers associated with the input data of the series of requests for comparison with the output data to detect the changes in the operation of the one or more software modules.

6. The computing apparatus of claim 3, wherein the enveloping framework determines whether to replay or to record the user activity with regards to the one or more software modules based at least on an instruction issued to the enveloping framework for instantiation of the one or more software modules.

7. The computing apparatus of claim 1, wherein the comparison of the previously recorded outputs to the replayed outputs comprises correlating, via the request identifiers, the previously recorded outputs to the replayed outputs.

8. The computing apparatus of claim 1, wherein a previous version of at least one of the software modules was employed to determine the previously recorded user activity; and wherein to detect changes in the operation of the one or more software modules, a comparison of behavior of the one or more software modules is performed using the previously recorded user activity.

9. A method of detecting changes in operation of software elements, comprising:
instantiating at least classes associated with one or more software modules within an enveloping framework that forms an encapsulation border for interception of inputs to the one or more software modules and outputs from to the one or more software modules;
in the enveloping framework, providing the inputs to the one or more software modules based on previously recorded user activity, the inputs associated with request identifiers mapping into the previously recorded user activity;
in the enveloping framework, intercepting the outputs comprising calls made by the one or more software modules to external dependencies by preventing the calls from reaching the external dependencies;
in the enveloping framework, presenting results to the one or more software modules responsive to the calls to the external dependencies, wherein the results are selected based at least on correlations with the request identifiers associated with the inputs; and
detecting changes in operation of the one or more software modules based in part on a comparison of previously recorded outputs from the one or more software modules to replayed outputs that are determined by the one or more software modules when using the inputs and the results.

10. The method of claim 9, wherein the one or more software modules comprise application programming interface (API) software methods contained in one or more classes, and wherein instantiating at least the classes associated with the one or more software modules within the enveloping framework comprises wrapping the one or more classes in the enveloping framework to selectively record or replay boundary activity for the API software methods comprising the inputs and the outputs.

11. The method of claim 9, further comprising:
in the enveloping framework, based at least on the enveloping framework configured to record the user activity to the one or more software modules:
instantiating at least the classes associated with the one or more software modules within the enveloping framework for recording the user activity associated with the one or more software modules;
monitoring user inputs among the user activity to the one or more software modules, and storing input data related to the user inputs in association with corresponding request identifiers;
monitoring the outputs determined by the one or more software modules responsive to the user inputs, and storing output data related to the outputs in association with ones of the request identifiers that correspond to the user inputs; and
monitoring external activity generated responsive to the user inputs between the one or more software modules and the external dependencies, and storing dependency data related to the external activity in association with the ones of the request identifiers that correspond to the user inputs.

12. The method of claim 11, further comprising:
during recording of the user activity, forming mappings between the request identifiers and sets of user activity values comprising the input data, the output data, and the dependency data; and
storing the mappings in one or more data structures for replay by the enveloping framework.

13. The method of claim 12, further comprising:
during replay of the user activity, initiating a series of requests comprising the input data to the one or more software modules, and tracking the replayed outputs using the request identifiers associated with the input data of the series of requests for comparison with the output data to detect the changes in the operation of the one or more software modules.

14. The method of claim 11, wherein the enveloping framework determines whether to replay or to record the user activity with regards to the one or more software modules based at least on an instruction issued to the enveloping framework for instantiation of the one or more software modules.

15. The method of claim 9, wherein the comparison of the previously recorded outputs to the replayed outputs comprises correlating, via the request identifiers, the previously recorded outputs to the replayed outputs.

16. The method of claim 9, wherein a previous version of at least one of the software modules was employed to determine the previously recorded user activity; and wherein to detect changes in the operation of the one or more software modules, a comparison of behavior of the one or more software modules is performed using the previously recorded user activity.

17. A computing apparatus comprising:
one or more computer readable storage media;
a processing system comprising a processor operatively coupled with the one or more computer readable storage media; and
program instructions stored on the one or more computer readable storage media, that when executed by the processing system, direct the processing system to at least:
instantiate at least classes associated with one or more software modules within an enveloping framework that forms a boundary for interception of inputs to the one or more software modules and interception of outputs from the one or more software modules based at least on an instruction issued to the enveloping framework for instantiation of the one or more software modules;
based at least on the enveloping framework placed in a replay mode of operation:
provide the inputs comprising replayed activity to the one or more software modules based on previously recorded user activity, the inputs each associated with unique identifiers mapping into the previously recorded user activity;
intercept the outputs by preventing calls made by the one or more software modules from reaching external services; and
monitor the outputs from the one or more software modules and correlate the outputs to the inputs using the unique identifiers; and
detect changes in operation of the one or more software modules based in part on a comparison of previously recorded outputs from the one or more software modules to the outputs that are determined by the one or more software modules when using the inputs.

18. The computing apparatus of claim 17, comprising further program instructions, when executed by the processing system, direct the processing system to at least:
based at least on the enveloping framework placed in a record mode of operation:
instantiate at least the classes associated with the one or more software modules within the enveloping framework for recording the user activity associated with the one or more software modules;
monitor user inputs among the user activity to the one or more software modules, and store input data related to the user inputs in association with corresponding unique identifiers;
monitor outputs determined by the one or more software modules responsive to the user inputs, and store output data related to the outputs in association with ones of the unique identifiers that correspond to the user inputs.

19. The computing apparatus of claim 17, comprising further program instructions, when executed by the processing system, direct the processing system to at least:
based at least on the enveloping framework placed in the replay mode of operation, intercept calls made by the one or more software modules to external services by withholding the calls to the external services and emulating behavior of the external services by at least presenting results to the one or more software modules responsive to the calls to the external services, wherein the results are selected based at least on correlations with the unique identifiers associated with the replayed inputs.

20. The computing apparatus of claim 17,
wherein the enveloping framework determines whether to replay or to record the user activity with regards to the one or more software modules based at least on an instruction issued to the enveloping framework for instantiation of the one or more software modules;
wherein the comparison of the previously recorded outputs to the replayed outputs comprises correlating, via the unique identifiers, the previously recorded outputs to the replayed outputs; and
wherein a previous version of at least one of the software modules was employed to determine the previously recorded user activity; and wherein to detect changes in the operation of the one or more software modules, a comparison of behavior of the one or more software modules is performed using the previously recorded user activity.

* * * * *